United States Patent
Leu

(10) Patent No.: US 7,647,791 B2
(45) Date of Patent: Jan. 19, 2010

(54) COMPOSITE MOLD FOR MOLDING GLASS LENS

(75) Inventor: Charles Leu, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 758 days.

(21) Appl. No.: 11/293,971

(22) Filed: Dec. 5, 2005

(65) Prior Publication Data
US 2006/0117797 A1 Jun. 8, 2006

(30) Foreign Application Priority Data
Dec. 8, 2004 (CN) .................. 2004 1 0077415

(51) Int. Cl.
*C03B 40/00* (2006.01)
(52) U.S. Cl. .................. 65/356; 65/374.11; 65/374.12; 65/374.15
(58) Field of Classification Search .................. 65/319, 65/356, 374.1, 374.11, 374.12, 374.13, 374.14, 65/374.15
See application file for complete search history.

(56) References Cited

U.S. PATENT DOCUMENTS

| | | | | |
|---|---|---|---|---|
| 4,092,140 A | * | 5/1978 | Cerutti et al. ................ 65/99.3 |
| 4,685,948 A | * | 8/1987 | Kuribayashi et al. ........... 65/26 |
| 5,188,652 A | * | 2/1993 | Nakamura et al. ............ 65/319 |
| 5,202,156 A | * | 4/1993 | Yamamoto et al. .......... 427/135 |
| 7,192,567 B1 | * | 3/2007 | Reilly ..................... 423/447.1 |
| 2002/0004136 A1 | * | 1/2002 | Gao et al. ................... 428/367 |
| 2002/0074479 A1 | * | 6/2002 | Frul ............................ 249/80 |
| 2002/0102353 A1 | * | 8/2002 | Mauthner et al. ...... 427/255.28 |

OTHER PUBLICATIONS

Wendy Pyper, Super Structures, Jul.-Sep. 2001, Ecos 108, pp. 8-9.*

* cited by examiner

*Primary Examiner*—Scott W Dodds
(74) *Attorney, Agent, or Firm*—Clifford O. Chi

(57) ABSTRACT

A composite mold includes a mold base, a protective film provided on the mold base, and a water-cooling heat dissipation system disposed within the mold base. Wherein, the protective film is comprised of with a plurality of $Re_xIr_y$ layers and a plurality of SiC layers, the $Re_xIr_y$ layers and the SiC layers are alternatively stacked one on another, x is in the range from 0.25 to 0.55, and y is in the range from 0.45 to 0.75. Alternatively, the protective film is comprised of an $Re_xIr_y$ layer, a catalyst layer and a carbon nanotube layer in that order, x is in the range from 0.25 to 0.55, and y is in the range from 0.45 to 0.75.

8 Claims, 2 Drawing Sheets

COMPOSITE MOLD FOR MOLDING GLASS LENS

TECHNICAL FIELD

The present invention relates to composite molds, and more particularly to a mold for molding glass articles such as lenses.

BACKGROUND

Glass optical articles, such as aspheric lenses, ball-shaped lenses, prisms, etc are generally made by a direct press-molding process using a mold. The glass optical articles obtained by the direct press-molding method advantageously do not need to undergo further processing, such as a polishing process. Accordingly, the manufacture efficiency can be greatly increased. However, the mold used in the direct press-molding method has to satisfy certain critical requirements such as high chemical stability, resistance to heat shock, good mechanical strength, and good surface smoothness.

Several criteria that should be considered in choosing the material for making the mold are listed below:
  a. the mold formed from such material is rigid and hard enough so that the mold cannot be damaged by scratching and can withstand high temperatures;
  b. the mold formed from such material is highly resistant to deformation or cracking even after repeated heat shock;
  c. the mold formed from such material does not react with or adhere to the glass material at high temperatures;
  d. the material is highly resistant to oxidization at high temperatures;
  e. the mold formed of such material has good machinability, high precision, and a smooth molding surface; and
  f. the manufacturing process using the mold is cost-effective.

In earlier years, the mold was usually made of stainless steel or a heat resistant metallic alloy. However, such mold typically has the following defects. Sizes of crystal grains of the mold material gradually become larger and larger over a period of time of usage, whereby the surface of the mold becomes more and more rough. In addition, the mold material is prone to being oxidized at high temperatures. Furthermore, the glass material tends to adhere to the molding surface of the mold.

Therefore, non-metallic materials and super hard metallic alloys have been developed for making molds. Such materials and alloys include silicon carbide (SiC), silicon nitride ($Si_3N_4$), titanium carbide (TiC), tungsten carbide (WC), and a tungsten carbide-cobalt (WC—Co) metallic alloy. However, SiC, $Si_3N_4$ and TiC are ultrahard ceramic materials. It is difficult to form such materials into a desired shape, especially an aspheric shape, with high precision. Further, WC and a WC—Co alloy are liable to be oxidized at high temperatures. All in all, these materials are not suitable for making high-precision molds.

Thus, a composite mold comprising a mold base and a protective film formed thereon has been developed. The mold base is generally made of a carbide material or a hard metallic alloy. The protective film is usually formed on a molding surface of the mold base.

Typically, the mold base of the composite mold is made of a hard metallic alloy, a carbide ceramic, or a metallic ceramic. The protective film of the composite mold is formed of a material selected from the group consisting of iridium (Ir), ruthenium (Ru), an alloy of Ir, platinum (Pt), rhenium (Re), osmium (Os), rhodium (Rh), and an alloy of Ru, Pt, Re, Os and Rh.

U.S. Pat. No. 5,202,156 discloses a method for making a composite mold. In this method, a mold base of the mold is made of a hard metallic alloy, a carbide ceramic, or a metallic ceramic. A diamond like carbon film is formed on a molding surface of the mold base as a protective film.

However, after a period of usage, the protective film is apt to crack or even peel off. Therefore, the quality of the glass products made by such mold is decreased, and the service lifetime of such mold may be shortened.

In view of the above shortcomings, a middle layer has been devised. The middle layer is arranged between the mold base and a noble metal protective film formed on the mold base. The material of the middle layer should have characteristics such as good machinability, high chemical stability, a high melting point, and resistance to migration of atoms. The material of the mold base should have characteristics of good heat resistance, high hardness, and excellent machinability. The noble metal protective film should have anti-oxidation characteristics and good smoothness. In general, the mold base is made by sintering a carbide material or a metallic ceramic. In the sintering process, metal elements such as cobalt (Co), nickel (Ni) or molybdenum (Mo) are generally introduced as additives. When the mold is in use, heat gradually accumulates therein and generally cannot be dissipated efficiently. Therefore, the temperature of the mold base is unduly elevated. After a period of repeated usage, the protective film is liable to peel off from the mold base. Therefore, the service lifetime of the mold may be shortened. In addition, the metal elements may migrate to a surface of the mold and react with the glass material. Therefore, the quality of the glass products formed may be diminished.

Furthermore, when the mold is in use, the accumulated heat may reach a level at which the mold must be temporarily decommissioned and allowed to cool. During this period of downtime, production must be halted or a backup mold must be commissioned. Therefore, the efficiency of mass manufacturing is decreased. Moreover, the mold is usually cooled by a gas cooling method. Commonly, nitrogen ($N_2$) gas is used as a cooling gas for cooling the mold. However, a large amount of $N_2$ gas is consumed in order to achieve satisfactory cooling.

Therefore, a low cost composite mold with good heat dissipation ability for improved manufacturing efficiency is desired.

SUMMARY

One embodiment of a composite mold comprises a mold base, a protective film provided on the mold base, and a water-cooling heat dissipation system disposed within the mold base. Wherein, the protective film is comprised of with a plurality of $Re_xIr_y$ layers and a plurality of SiC layers, the $Re_xIr_y$ layers and the SiC layers are alternatively stacked one on another, x is in the range from 0.25 to 0.55, and y is in the range from 0.45 to 0.75.

Another embodiment of a composite mold comprises a mold base, a protective film provided on the mold base, and a water-cooling heat dissipation system disposed within the mold base. Wherein, the protective film is comprised of an $Re_xIr_y$ layer, a catalyst layer and a carbon nanotube layer in that order, x is in the range from 0.25 to 0.55, and y is in the range from 0.45 to 0.75.

The water-cooling heat dissipation system operates within the mold base of the mold. By configuration of the water-cooling heat dissipation system, even though the molding process is performed at temperatures ranging from 400 degrees Celsius to 600 degrees Celsius, the heat can be effectively dissipated, so that the temperature of the mold can be readily controlled within a desired range. The film resists chipping or peeling front the mold base. Therefore, the precision of the mold and the quality of the glass products will not be affected, the service lifetime of the mold may be prolonged. Furthermore, the mold needs not being replaced and the manufacturing efficiency will not reduce.

Compared with the conventional method that employs $N_2$ gas as a coolant for cooling the mold, the present method that employs water as a coolant is cost-effective, because the water is relatively cheap and can be recycled.

Because the protective film comprises carbon nanotubes that characteristically have a high hardness, a high toughness, a high surface area, a high surface curvature and a high thermal conductivity, the mold is able to provide superior heat dissipation capability.

Other advantages and novel features will become more apparent from the following detailed description when taken in conjunction with the accompanying drawings, in which:

BRIEF DESCRIPTION OF THE DRAWINGS

Many aspects of a composite mold for molding glass lenses can be better understood with reference to the following drawings. The components in the drawings are not necessarily to scale, the emphasis instead being placed upon clearly illustrating the principles of the present mold. Moreover, in the drawings, like reference numerals designate corresponding parts throughout the two views.

DETAILED DESCRIPTION OF THE EMBODIMENTS

The present invention is further described below with reference to the figures.

Figure 1:
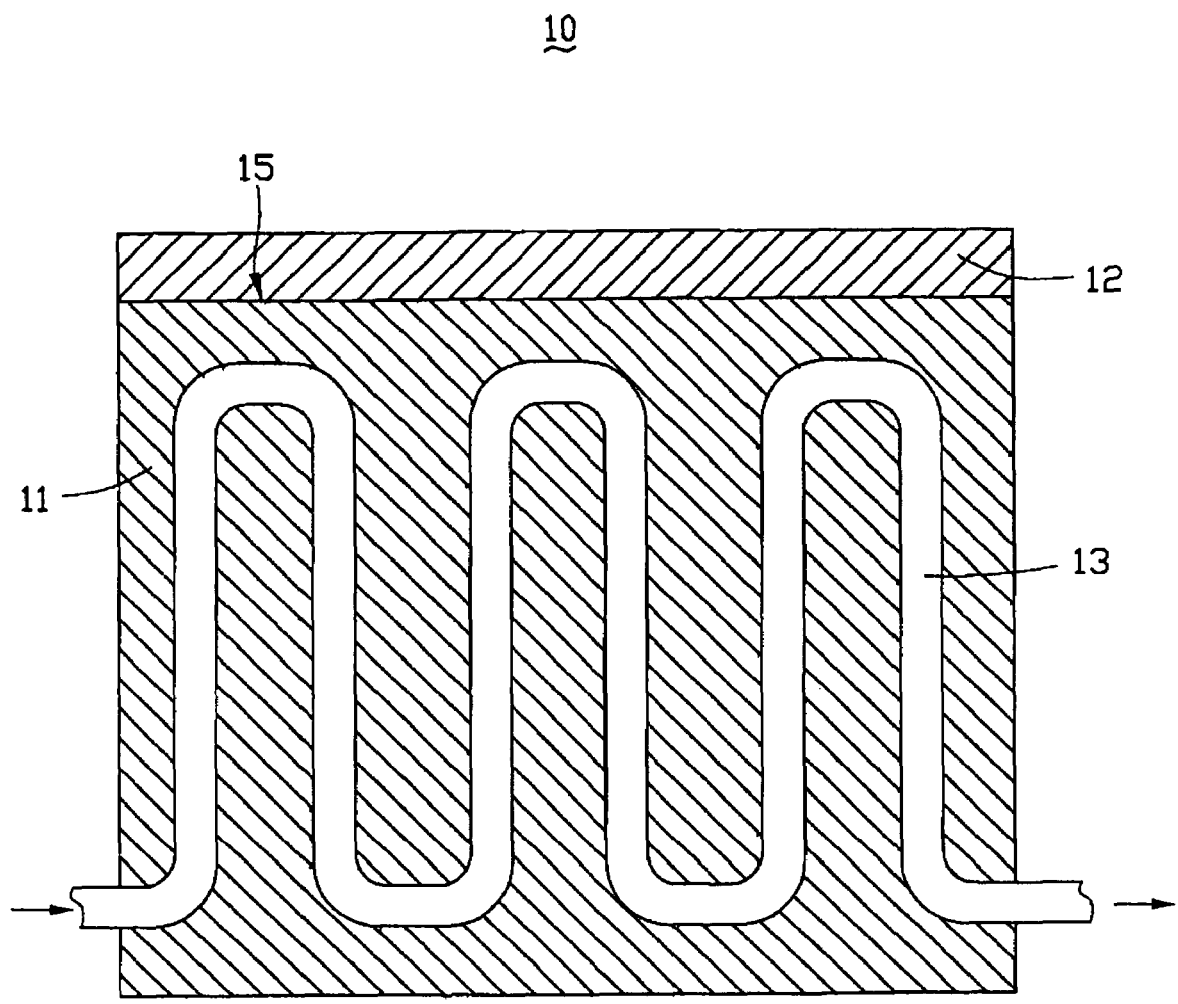
FIG. 1 is a schematic, cross-sectional view of a mold in accordance with a first embodiment of the present invention.

FIG. 1 shows a mold 10 for molding glass lenses according to a first embodiment of the present invention. The mold 10 includes a mold base 11 having a smooth surface 15, and a protective film 12 formed on the surface 15. The mold base 11 is made from stainless steel. The surface 15 of the mold base 11 is machined by an ultra-precision engraving machine, thereby obtaining a desired shape for the surface 15. A water-cooling heat dissipation system 13 is disposed within the mold base 11, for improving a heat dissipation ability of the mold 10. The water-cooling heat dissipation system 13 includes a heat pipe configured in a concertinaed fashion and disposed adjacent the film 12.

The film 12 comprises a multilayer structure having a number of $Re_xIr_y$ layers and a number of SiC layers alternately stacked one on another. The $Re_xIr_y$ layers and the SiC layers are deposited on the surface 15 of the mold base 11 by a vacuum plasma coating method. Due to the multilayer structure, growth stresses of the $Re_xIr_y$ layers may be minimized or even eliminated. In addition, a chemical stability and a hardness of the film 12 are improved. A thickness of each of the $Re_xIr_y$ layers is advantageously configured to be in the range from 10 nanometers to 20 nanometers; wherein x is in the range from 0.25 to 0.55, and y is in the range from 0.45 to 0.75. A thickness of each of the SiC layers is advantageously configured to be in the range from 5 nanometers to 20 nanometers. In the described embodiment, the number of $Re_xIr_y$ layers or SiC layers is advantageously configured to be in the range from 5 to 20.

The water-cooling heat dissipation system 13 operates within the mold base 11 of the mold 10. Even when the molding process is performed at temperatures in the range from 400 degrees Celsius to 600 degrees Celsius, the heat can be effectively dissipated by the water-cooling beat dissipation system 13, whereby the temperature of the mold 10 can be readily controlled to remain within a desired range. Thus, the film 12 is resistant to be peeled off from the mold base 11. The precision of the mold 10 is maintained. The quality of the glass lenses is improved. The service lifetime of the mold 10 is prolonged. Furthermore, replacement of the mold 10 is infrequent or not even necessary; therefore the efficiency of mass manufacturing is improved.

Compared with the conventional method that employs $N_2$ gas as a coolant for cooling a mold, the above-described embodiment that employs water as a coolant is cost-effective, because water is relatively cheap and can be recycled.

In alternative embodiments, the mold base 11 can be made from tungsten carbide or a metallic ceramic.

It is noted that, in addition to molding optical glass products having smooth surfaces, the mold 10 can also be used for molding other products having different shapes and configurations.

Glass lenses are usually molded under a pressure of about 200 kg/cm² and at temperatures in the range from 400 degrees Celsius to 600 degrees Celsius. Accordingly, the mold 10 is required to have a satisfactory hardness. As is known, carbon nanotubes have many superior characteristics such as low weight, high hardness, good toughness, high surface area, high surface curvature, and high thermal/electrical conductivity. A thermal conductivity of carbon nanotubes is about 23.2 W/cm·k. The electrical conductivity of carbon nanotubes depends on a tube diameter and a chirality thereof. Typically, the electrical conductivity of carbon nanotubes is in the range from $10^{-3}$ Ω·cm to $10^{-4}$ Ω·cm. The Young's modulus of carbon nanotubes is about $10^{12}$ Pa, which is about 5 to 6 times the Young's modulus of steel. Carbon nanotubes are utilized herein in a protective film for an inventive mold, as described below.

Figure 2:
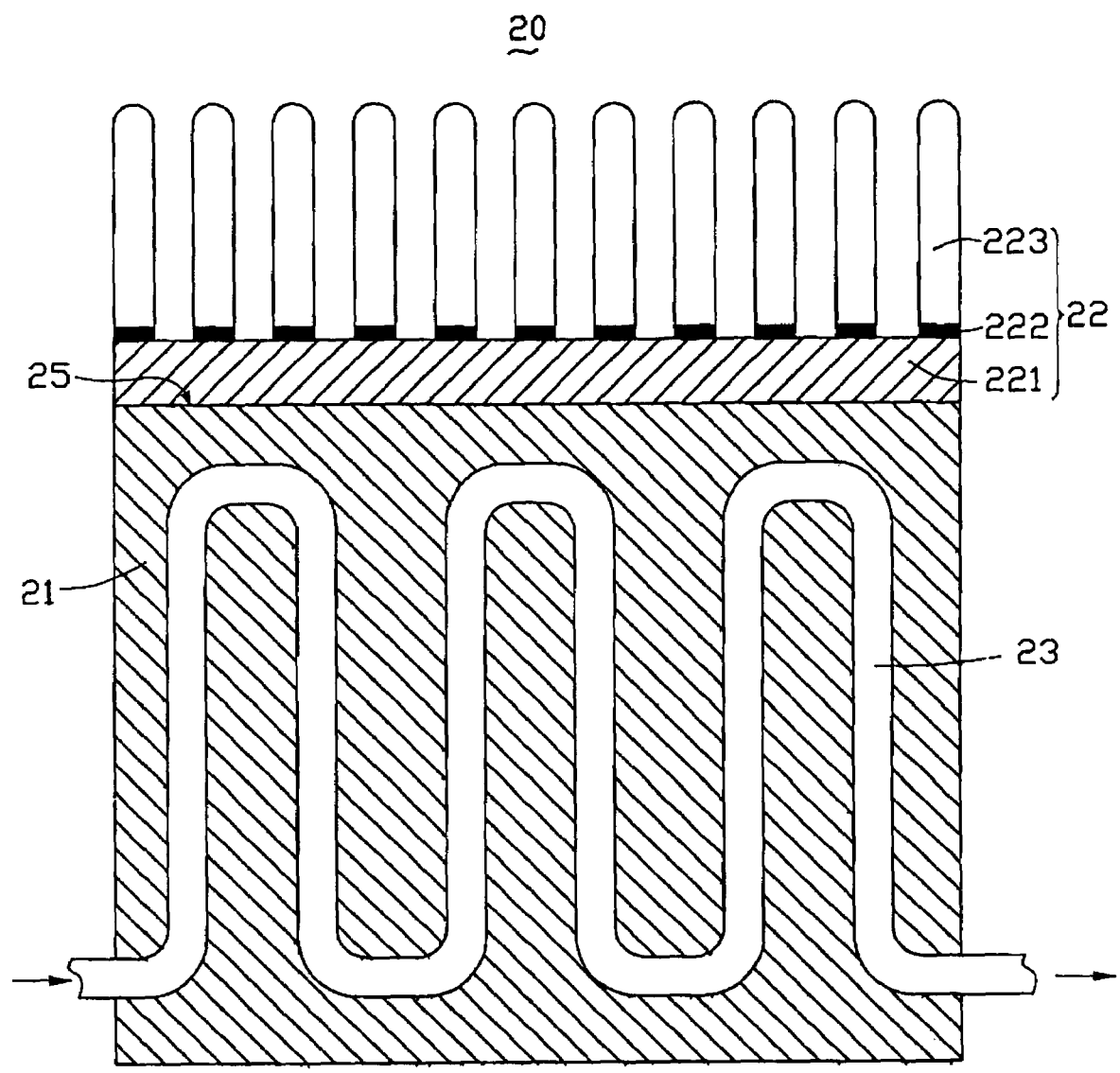
FIG. 2 is a schematic, cross-sectional view of a mold in accordance with a second embodiment of the present invention.

FIG. 2 shows a mold 20 according to a second embodiment of the present invention. The mold 20 is for molding glass lenses; and includes a mold base 21 having a smooth surface 25, and a protective film 22 formed on the surface 25. The mold base 21 is made from stainless steel. The surface 25 of the mold base 21 is machined by an ultra-precision engraving machine, thereby obtaining a desired shape for the surface 25. In addition, a water-cooling heat dissipation system 23 is disposed within the mold base 21. The water-cooling heat dissipation system 23 includes a heat dissipation pipe configured in a concertinaed fashion and disposed adjacent the film 22.

The film 22 comprises an $Re_xIr_y$ layer 221, a catalyst layer 222, and a carbon nanotube layer 223. The $Re_xIr_y$ layer 221 is deposited on the surface 25 of the mold base 21 by a vacuum plasma coating method. In the described embodiment, a thickness of the $Re_xIr_y$ layer is advantageously configured to be in the range from 10 nanometers to 700 nanometers, and preferably in the range from 500 nanometers to 700 nanometers; wherein x is in the range from 0.25 to 0.55, and y is in the range from 0.45 to 0.75. The catalyst layer 222 is deposited on the $Re_xIr_y$ layer 221. Preferably, a thickness of the catalyst layer 222 is in the range from 1 nanometer to 100 nanometers. The catalyst layer 222 is comprised of iron (Fe), cobalt (Co), nickel (Ni), or any suitable combination thereof. The carbon nanotube layer 223 is formed on the catalyst layer 222 by a chemical vapor deposition method. Firstly the catalyst layer 222 is reduced by hydrogen ($H_2$) at temperatures in the range from 300 degrees Celsius to 500 degrees Celsius, and then carbon nanotubes are formed on the catalyst layer 222.

During the process of molding a glass lens, the water-cooling heat dissipation system 23 operates within the stainless steel mold base 21 of the mold 20. Even at temperatures in the range from 400 degrees Celsius to 600 degrees Celsius, the heat can be efficiently dissipated by the water-cooling heat dissipation system 23. Thus the film 22 resists being peeled off from the mold base 21. Therefore, the precision of the mold 20 is maintained. The quality of the glass lenses produced is improved. The service lifetime of the mold 20 is prolonged. Furthermore, downtime needed for cooling of the mold 20 is reduced or even eliminated; therefore the efficiency of mass manufacturing is improved.

Compared with the conventional method that employs. $N_2$ gas as a coolant for cooling a mold, the above-described embodiment that employs water as a coolant is cost-effective, because water is relatively cheap and can be recycled.

Because the film 22 is formed with carbon nanotubes that characteristically have a high hardness, a high toughness, a high surface area, a high surface curvature and a high thermal conductivity, the mold 20 is able to provide superior heat dissipation capability.

In alternative embodiments, the mold base 21 can be made from tungsten carbide or a metallic ceramic.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A composite mold for molding glass lenses, comprising: a mold base, an $Re_xIr_y$ layer provided on the mold base, a catalyst layer formed on the $Re_xIr_y$ layer, a carbon nanotube layer consisting of carbon nanotubes formed on the catalyst layer, and a water-cooling heat dissipation system disposed within the mold base, wherein x is in the range from 0.25 to 0.55, and y is in the range from 0.45 to 0.75, the catalyst layer is comprised of a material selected from the group consisting of iron, cobalt and nickel.

2. The composite mold in accordance with claim 1, wherein a material of the mold base is selected from the group consisting of stainless steel, tungsten carbide, and metallic ceramic.

3. The composite mold in accordance with claim 1, wherein the water-cooling heat dissipation system comprises a heat pipe configured in a concertinaed fashion and disposed adjacent the $Re_xIr_y$ layer.

4. The composite mold in accordance with claim 1, wherein the $Re_xIr_y$ layer is deposited on the mold base by a vacuum plasma coating method.

5. The composite mold in accordance with claim 1, wherein a thickness of the $Re_xIr_y$ layer is in the range from 10 nanometers to 700 nanometers.

6. The composite mold in accordance with claim 1, wherein the catalyst layer is deposited on the $Re_xIr_y$ layer.

7. The composite mold in accordance with claim 1, wherein a thickness of the catalyst layer is in the range from 1 nanometer to 100 nanometers.

8. The composite mold in accordance with claim 1, wherein the carbon nanotube layer is formed on the catalyst layer by a chemical vapor deposition method.

* * * * *

UNITED STATES PATENT AND TRADEMARK OFFICE
CERTIFICATE OF CORRECTION

PATENT NO.      : 7,647,791 B2                                         Page 1 of 1
APPLICATION NO. : 11/293971
DATED           : January 19, 2010
INVENTOR(S)     : Charles Leu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Sixteenth Day of November, 2010

David J. Kappos
*Director of the United States Patent and Trademark Office*